(12) United States Patent
Carling et al.

(10) Patent No.: US 9,477,868 B1
(45) Date of Patent: Oct. 25, 2016

(54) ADAPTIVE FINGERPRINT-BASED NAVIGATION

(71) Applicant: Fingerprint Cards AB, Göteborg (SE)

(72) Inventors: David Carling, Mölndal (SE); Eric Setterberg, Västra Frölunda (SE); Hans Thörnblom, Kungsbacka (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/006,503

(22) Filed: Jan. 26, 2016

(30) Foreign Application Priority Data

Jun. 4, 2015 (SE) ........................ 1550727

(51) Int. Cl.
*G06K 9/00* (2006.01)
*G06F 3/0354* (2013.01)
(52) U.S. Cl.
CPC ....... *G06K 9/00013* (2013.01); *G06F 3/03543* (2013.01); *G06F 3/03547* (2013.01); *G06F 2203/0336* (2013.01)
(58) Field of Classification Search
CPC .................. G06F 3/03547; G06F 2203/0338; G06F 3/044; G06F 21/32; G06K 9/00026; G06K 9/0002; G06K 9/00013
USPC ........ 382/124; 345/157, 173, 174; 340/5.53, 340/5.38
See application file for complete search history.

(56) References Cited

U.S. PATENT DOCUMENTS

| | | | | |
|---|---|---|---|---|
| 6,392,636 B1 * | 5/2002 | Ferrari | ................ | G06F 3/03547 345/157 |
| 6,408,087 B1 | 6/2002 | Kramer | | |
| 2004/0096086 A1 * | 5/2004 | Miyasaka | ........... | G06F 3/03547 382/124 |
| 2005/0179657 A1 * | 8/2005 | Russo | ..................... | G06F 3/038 345/163 |
| 2012/0308092 A1 * | 12/2012 | Benkley | .............. | G06F 3/03547 382/124 |

* cited by examiner

*Primary Examiner* — Koosha Sharifi-Tafreshi
(74) *Attorney, Agent, or Firm* — Remarck Law Group PLC

(57) ABSTRACT

A fingerprint-based navigation method using a finger navigation system comprising fingerprint sensing circuitry and navigation control circuitry. The method comprises the steps of: acquiring a series of navigation sequences of fingerprint images, and for each navigation sequence in the series of navigation sequences: determining an estimated momentary finger movement based on the navigation sequence of fingerprint images; determining at least one fingerprint image parameter value indicative of a fingerprint image status based on at least one fingerprint image in the navigation sequence of fingerprint images; and evaluating the fingerprint image status. The method further comprises the steps of determining a fingerprint sensing circuitry setting based on the evaluation; and providing the fingerprint sensing circuitry setting to the fingerprint sensing circuitry only during a time period between acquisition of a final fingerprint image in one navigation sequence and acquisition of a first fingerprint image in another, directly succeeding, navigation sequence.

16 Claims, 5 Drawing Sheets

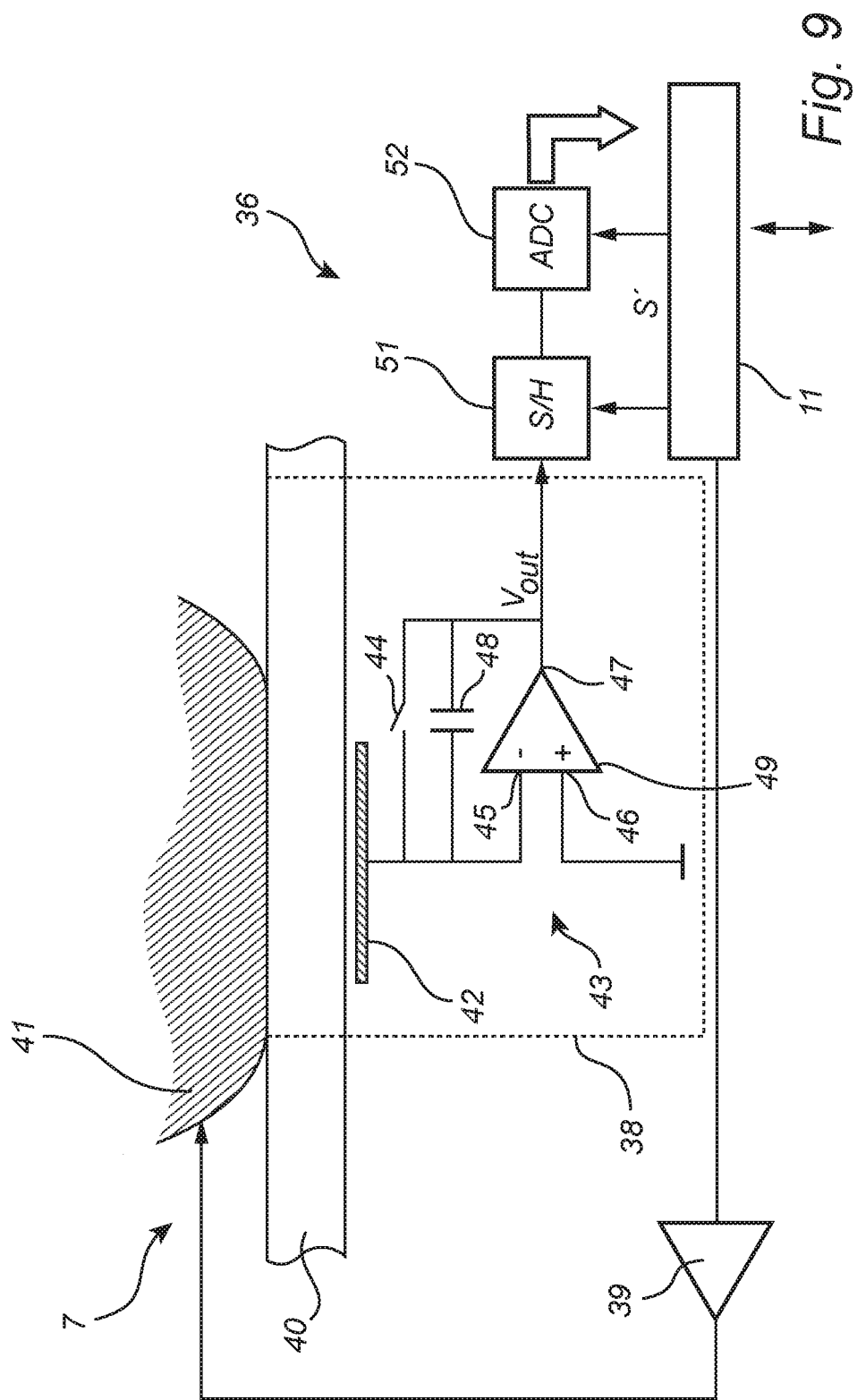

ADAPTIVE FINGERPRINT-BASED NAVIGATION

CROSS-REFERENCE TO RELATED APPLICATIONS

This application claims the benefit of Swedish Patent Application No. 1550727-0 filed Jun. 4, 2015. The disclosure of the above application is incorporated herein by reference in its entirety.

FIELD OF THE INVENTION

The present invention relates to a method and system for estimating a finger movement using a fingerprint sensor.

BACKGROUND OF THE INVENTION

Fingerprint sensors are sometimes used as "navigation tools", for example to move a cursor or pointer on a display or to perform selections of items presented on a display etc.

To be able to use a fingerprint sensor for such a navigation tool application, it is necessary to somehow track movement of the finger of a user across the fingerprint sensor.

According to one approach, described in U.S. Pat. No. 6,408,087, successive fingerprint images are captured at a frame rate of 1000 frames per second, and the displacement of fingerprint ridges and pores is determined based on a comparison of the successive fingerprint images.

Although the use of a capacitive fingerprint sensor for controlling a pointer as described in U.S. Pat. No. 6,408,087 has several benefits as compared to conventional pointing devices, there still appears to be room for improvement.

SUMMARY

In view of the above-mentioned and other drawbacks of the prior art, it is an object of the present invention to provide for an improved estimation of a finger movement using a fingerprint sensor.

According to a first aspect of the present invention, it is therefore provided a method of fingerprint-based navigation using a finger navigation system comprising fingerprint sensing circuitry and navigation control circuitry, the method comprising the steps of: acquiring, by the fingerprint sensing circuitry, a series of navigation sequences of fingerprint images; determining, by the navigation control circuitry, for each navigation sequence in the series of navigation sequences, an estimated momentary finger movement based on the navigation sequence of fingerprint images; determining, by the navigation control circuitry, for each navigation sequence in the series of navigation sequences, at least one fingerprint image parameter value indicative of a fingerprint image status based on at least one fingerprint image in the navigation sequence of fingerprint images; evaluating, by the navigation control circuitry, for each navigation sequence in the series of navigation sequences, the fingerprint image status; determining, by the navigation control circuitry, a fingerprint sensing circuitry setting based on the evaluation; and providing, by the navigation control circuitry, the fingerprint sensing circuitry setting to the fingerprint sensing circuitry only during a time period between acquisition of a final fingerprint image in one navigation sequence and acquisition of a first fingerprint image in another, directly succeeding, navigation sequence.

The fingerprint sensing circuitry may, for example, comprise a plurality of sensing elements arranged in an array. The fingerprint sensing circuitry may detect a measure indicative of the capacitive coupling between each sensing element in the array of sensing elements and a finger surface touching the fingerprint sensor surface. Sensing elements at locations corresponding to ridges in the fingerprint will exhibit a stronger capacitive coupling to the finger than sensing elements at locations corresponding to valleys in the fingerprint.

However, the various embodiments of the present invention are not limited to a particular fingerprint sensing technology, but are equally applicable to, for instance, optical, thermal or piezo-electric fingerprint sensors etc.

Each navigation sequence of fingerprint images comprises a plurality of fingerprint images acquired in succession. Each navigation sequence has a first fingerprint image and a final fingerprint image. By comparing later fingerprint images in the navigation sequence with at least one earlier fingerprint image in the navigation sequence (typically the first fingerprint image in the navigation sequence), the finger movement during the navigation sequence can be estimated.

An "estimated momentary finger movement" should be understood as an estimation of at least one of a finger movement direction and a finger speed determined based on a navigation sequence of fingerprint images.

The at least one fingerprint image parameter value indicative of a fingerprint image status, may be any parameter value that conveys information allowing for a meaningful evaluation of the status of the fingerprint image. For instance, the evaluation may reveal that the fingerprint image has insufficient contrast and/or is saturated etc. Alternatively or in combination, the development over time of the fingerprint image status may be evaluated, so that a degradation of the fingerprint image quality can be discovered and counteracted.

Accordingly, the evaluation of the fingerprint image status may be based on one or several fingerprint image parameter values being related to one or several navigation sequences of fingerprint images.

By the term "fingerprint sensing circuitry setting" should be understood any combination of settings influencing the sensing operation of the fingerprint sensing circuitry. For instance, the fingerprint sensing circuitry setting may include amplification, analog-to-digital conversion parameters (such as shift and/or gain), sampling parameters (such as sampling time and/or number of samples), etc.

The present invention is based upon the realization that the fingerprint image status may change rapidly during navigation, for example due to sudden and large variations in the force with which the finger is pressed against the fingerprint sensor surface, and that it therefore would be desirable to modify the fingerprint sensing settings during navigation.

The present inventors have further realized that a modification of the fingerprint settings during a navigation sequence may affect the finger movement estimation in a negative way, and that the desired improved navigation performance can be achieved by extracting image status information from at least one fingerprint image in each navigation sequence, determining updated fingerprint sensor settings based on the extracted images status, and only allowing implementation of the updated fingerprint sensor settings in time periods between consecutive navigation sequences.

Hereby, the fingerprint sensor settings can be adapted during finger navigation without risking that changes in the fingerprint sensor settings negatively affects individual momentary finger movement estimations. Accordingly, adaptive finger navigation can be achieved, that is capable of adapting fingerprint sensing circuitry parameters to compensate for, for instance, variations in finger pressure during finger navigation. This, in turn, provides for a more reliable and accurate finger navigation.

Advantageously, image status information may be extracted from each fingerprint image in the navigation sequence, so that the at least one fingerprint image parameter value may be based on the entire navigation sequence, which may further increase the reliability of the subsequent evaluation of the fingerprint image status.

To provide for accurate and reliable finger navigation at high finger speeds, it is typically desirable to acquire (partial) fingerprint images with a very high acquisition rate, such as 3000 fingerprint images per seconds or more. In order to facilitate determination of the momentary finger movement and the determination of the at least one fingerprint image parameter value at such high image acquisition rates, it may be advantageous to at least partly implement the navigation control circuitry in hardware.

In embodiments of the present invention, the navigation control circuitry may comprise movement estimation circuitry and process control circuitry. The division of work between the movement estimation circuitry and process control circuitry may advantageously be such that the movement estimation circuitry may be suitable to realize as hardware and close to the fingerprint sensing circuitry, and the process control circuitry may be suitable to, at least partly, realize as software running on a processor.

Accordingly, the tasks according to embodiments of the method according to the present invention may be divided between the movement estimation circuitry and the process control circuitry in the following way:

The movement estimation circuitry may be connected to the fingerprint sensing circuitry to process the acquired fingerprint images to determine the estimated momentary finger movement and the at least one fingerprint image parameter value based on fingerprint images in each navigation sequence.

The movement estimation circuitry may further be connected to the process control circuitry to provide a signal indicative of the estimated momentary finger movement and the at least one fingerprint image parameter value to the process control circuitry for each navigation sequence.

The process control circuitry may, in turn, provide a navigation signal based on the series of momentary finger movement estimations received from the movement estimation circuitry, and evaluate the fingerprint image status based on the series of fingerprint image parameter values received from the movement estimation circuitry.

At least when the evaluation of the fingerprint image status indicates that an improvement in the image quality would be desirable, the process control circuitry may determine an updated fingerprint sensing circuitry setting and provide this updated fingerprint sensing circuitry setting to the movement estimation circuitry.

When receiving the updated fingerprint sensing circuitry setting from the process control circuitry, the movement estimation circuitry controls the time of the updating of the fingerprint sensing circuitry setting until the next allowed time period for updating, which takes place between acquisition of consecutive navigation sequences of fingerprint images—in particular in the time period after acquisition of the final fingerprint image in one navigation sequence and before acquisition of the first fingerprint image in the directly succeeding navigation sequence.

Advantageously, the navigation control circuitry may store the updated fingerprint sensing circuitry setting before providing it to the fingerprint sensing circuitry. In embodiments, the movement estimation circuitry may, for example, write the fingerprint sensing circuitry setting to a storage register, and then write the content of this storage register to a register holding the current fingerprint sensing circuitry setting of the fingerprint sensing circuitry.

According to embodiments, the step of evaluating the fingerprint image status may comprise the step of evaluating the estimated momentary finger movement, and the fingerprint sensing circuitry setting may further be based on the evaluation of the estimated momentary finger movement.

When, for instance, the estimated momentary finger movement indicates that the finger is currently moving relatively slowly, the fingerprint sensing circuitry setting may be updated to allow more time for acquisition of each fingerprint image in the navigation sequence. Depending on the sensing method, the extra time may be used in different ways to improve the image quality. For example, multi-sampling may be allowed, which may improve the signal-to-noise ratio of the fingerprint images. This may, in turn, provide for improved accuracy and/or reliability of the finger navigation.

For instance, the fingerprint sensing circuitry and the movement estimation circuitry may advantageously both be included in a fingerprint sensor component, and the process control circuitry may be included in a separate control unit being connected to the fingerprint sensor component for controlling operation thereof.

According to various embodiments, furthermore, each navigation sequence of fingerprint images may comprise a reference fingerprint image acquired at a reference fingerprint image acquisition time; and at least one candidate fingerprint image acquired at each candidate fingerprint image acquisition time in a time sequence of candidate fingerprint image acquisition times; and the step of determining the estimated momentary finger movement may comprise the steps of: determining, for each of the candidate fingerprint image acquisition times, a match parameter value for each of a plurality of candidate finger movement directions, the match parameter value being indicative of a correlation between a reference fingerprint image portion corresponding to a reference area of the fingerprint sensor and a candidate fingerprint image portion corresponding to a candidate area of the fingerprint sensor, the candidate area being displaced in the candidate finger movement direction in relation to the reference area; and estimating the finger movement based on an evaluation of the determined match parameter values.

The candidate fingerprint images are always acquired after acquisition of the reference fingerprint image.

It should be noted that the reference fingerprint image portion and the candidate fingerprint image portion may be of any shape, either continuous or non-continuous. According to one example, each image portion may be a solid rectangle of image pixels, and according to another example, each image portion may be a set of distributed image pixels.

Using an analogy from a compass, the candidate finger movement directions may, for example, include north, northwest, west, southwest, etc.

In the context of the present application, a "fingerprint image portion" may be the entire acquired fingerprint image, or a part thereof.

The match parameter value indicating the correlation between a candidate fingerprint image portion and the reference fingerprint image portion may be higher or lower for a stronger correlation (similarity) between the candidate fingerprint image portion and the reference fingerprint image portion.

According to one example, the match parameter value may be a measure of the difference between the candidate fingerprint image portion and the reference fingerprint image portion. In that case, a lower value of the match parameter value indicates a stronger correlation between the fingerprint image portions. Alternatively, the match parameter value may be a measure of the correspondence or likeness between the fingerprint image portions.

According to embodiments, each candidate area may be displaced by a respective known displacement distance in relation to the reference area; and the candidate fingerprint images may be acquired with an acquisition frequency resulting in acquisition of at least three candidate fingerprint images during the time needed for the finger to move the displacement distance.

A finger navigation system will typically be designed for an estimated maximum finger speed. During the time needed for the finger to move the above-mentioned displacement distance at that maximum finger speed, at least three candidate fingerprint images should preferably be acquired. During the same period of time, a time sequence of at least three match parameter values should be determined, to make it possible to determine a reasonably accurate estimated momentary finger movement.

For a fingerprint sensor with an array of sensing elements arranged with a sensing element pitch (distance between the centers of adjacent sensing elements in a row or column of the array of sensing elements in the fingerprint sensor) the shortest possible displacement distance may be the sensing element pitch.

As a reasonable example, the sensing element pitch can be assumed to be about 50 μm, which is common for fingerprint sensor, and the lowest maximum finger speed for acceptable performance for a finger navigation system may be about 5 cm/s.

Accordingly, at least three candidate fingerprint images may advantageously be acquired during the time needed for a finger moving at 5 cm/s to move 50 μm, which translates to at least 3000 candidate fingerprint images per second.

To further improve performance of the finger navigation system, the finger navigation system may advantageously be designed for a maximum finger speed of at least about 10 cm/s, which, with a sensing element pitch of 50 μm translates to acquiring and processing at least about 6000 candidate fingerprint images per second. It may also be beneficial to acquire significantly more than three candidate fingerprint images during the time needed for the finger to move the displacement distance. For instance, it may be advantageous to acquire at least five candidate fingerprint images during that time. For the examples given above, that would correspond to at least 5000, and at least 10000 candidate fingerprint images per second, respectively.

According to various embodiments, furthermore, each candidate area may be displaced by a respective known displacement distance in relation to the reference area; and the step of determining the momentary finger movement estimation may comprise estimating a speed of the finger based on the evaluation of the determined match parameter values, and the known displacement distances.

The evaluation of the match parameter values will give an indication of the direction of finger movement as well as the time needed for the finger to move the known displacement distance in that direction.

From the time and the known displacement distance, the finger movement speed can be estimated. As was described above, the finger movement direction may be estimated to be between two candidate finger movement directions, and the distance and time, or finger movement speed, may be estimated based on such a direction, for example through averaging.

In various embodiments, the known displacement distance may correspond to one or several sensing element(s) in each candidate finger movement direction. In the row/column directions, the displacement distance will then be a multiple of the sensing element pitch, and in a diagonal direction, the displacement direction will be longer, such as the multiple of the sensing element pitch time the square root of two for a square candidate area etc.

The estimation of the finger movement may be improved even further by introducing a varying delay (time period) between the reference fingerprint image acquisition time and the first candidate fingerprint image acquisition time for the different momentary finger movement estimations. This is particularly the case for high finger movement speeds where a quantization error due to the pixel configuration of the reference image portion and the candidate image portion may result in a relatively large error in terms of speed.

Hence, a first navigation sequence may exhibit a first time period between the reference fingerprint image acquisition time and a first candidate fingerprint image acquisition time in the time sequence; and the second navigation sequence exhibits a second time period, different from the first time period, between the reference fingerprint image acquisition time and a first candidate fingerprint image acquisition time in the time sequence.

The estimation of the finger movement, in particular the finger speed, may then additionally be based on the first time period and the second time period. The above-mentioned time period may vary between a rather large number of different time periods, such as at least four different time periods, according to a predetermined pattern. This will make it possible to determine which of the different time periods results in a best correspondence between a particular candidate fingerprint acquisition time and the finger movement time needed for the finger to move the above-mentioned displacement distance at the finger speed to be estimated.

According to various embodiments, each of the acquired candidate fingerprint images may comprise a plurality of different candidate fingerprint image portions corresponding to displacement in different candidate finger movement directions.

In these embodiments, a different candidate fingerprint image portion of an acquired candidate fingerprint image may be correlated with the reference fingerprint image portion to determine match parameter values for each candidate finger movement direction. From this follows that each candidate fingerprint image portion is smaller (comprises fewer pixels) than the full candidate fingerprint image.

Moreover, the reference fingerprint image may comprise a plurality of different reference fingerprint image portions corresponding to displacement in different candidate finger movement direction in relation to a single candidate fingerprint image portion.

As an alternative to the above-described embodiments, the candidate fingerprint image portion may then, for example, be constituted by the entire acquired candidate fingerprint image. The candidate fingerprint image portion may be correlated with different reference fingerprint image portions to determine match parameters for each candidate finger movement direction. In these embodiments, a smaller (in number of pixels) candidate fingerprint image may be acquired. Since candidate fingerprint images may, as was described above, advantageously be acquired with a rather high acquisition frequency (such as at least 3000 images per second), a smaller candidate fingerprint image will result in reduced processing, which may in turn provide for reduced complexity and/or reduced energy consumption and/or improved performance in terms of maximum finger speed for the finger navigation system.

Hybrid embodiments in which the reference fingerprint image comprises a plurality of reference fingerprint image portions and each candidate fingerprint image comprises a plurality of candidate fingerprint image portions may also be advantageous depending on application.

To facilitate the determination of match parameter values, the reference fingerprint image portion and each candidate fingerprint image portion may advantageously have the same spatial configuration (height, width, pixel distribution etc). Accordingly, the candidate area may advantageously have the same sensing element configuration as the reference area.

The reference and candidate areas may advantageously include less than one hundred sensing elements, which allows for use of a very small fingerprint sensor.

According to embodiments, the match parameter value for each of the plurality of candidate finger movement directions may be determined using a block matching algorithm.

The match parameter value may, for example, be the output of a so-called cost function. Well known cost functions include, for instance the sum of absolute differences, the mean absolute difference, the sum of squared errors, and the mean squared error.

When a finger movement (direction and/or speed) has been estimated, a signal indicative thereof may be provided to an external control unit for controlling an electronic device based on the detected finger movement.

According to a second aspect of the present invention, there is provided a finger navigation system for estimating a finger movement of a finger, the finger navigation system comprising: fingerprint sensing circuitry for acquiring a series of navigation sequences of fingerprint images; and navigation control circuitry for: determining, for each navigation sequence in the series of navigation sequences, an estimated momentary finger movement based on the navigation sequence of fingerprint images; determining, for each navigation sequence in the series of navigation sequences, at least one fingerprint image parameter value indicative of a fingerprint image status based on at least one fingerprint image in the navigation sequence of fingerprint images; evaluating, for each navigation sequence in the series of navigation sequences, the fingerprint image status; determining, a fingerprint sensing circuitry setting based on the evaluation; and providing the fingerprint sensing circuitry setting to the fingerprint sensing circuitry only during a time period between acquisition of a final fingerprint image in one navigation sequence and acquisition of a first fingerprint image in another, directly succeeding, navigation sequence.

As was discussed further above in connection with the first aspect of the present invention, the navigation control circuitry may advantageously comprise movement estimation circuitry and process control circuitry.

According to various embodiments, the fingerprint sensing circuitry and at least the movement estimation circuitry may be comprised in a single semiconductor component.

This provides for a low-cost finger navigation system, which is very compact and has a low power consumption.

Furthermore, for high fingerprint sensing performance and robustness, each sensing elements comprised in the fingerprint sensing circuitry may advantageously comprise: a protective dielectric top layer to be touched by the finger; an electrically conductive sensing structure arranged underneath the top layer; and charge measuring circuitry connected to the sensing structure for providing a sensing signal indicative of a change of a charge carried by the sensing structure resulting from a change in a potential difference between the finger and the sensing structure. The charge measuring circuitry may comprise a charge amplifier.

Further embodiments of, and effects obtained through this second aspect of the present invention are largely analogous to those described above for the first aspect of the invention.

In summary, the present invention relates to a fingerprint-based navigation method using a finger navigation system comprising fingerprint sensing circuitry and navigation control circuitry. The method comprises the steps of: acquiring a series of navigation sequences of fingerprint images, and for each navigation sequence in the series of navigation sequences: determining an estimated momentary finger movement based on the navigation sequence of fingerprint images; determining at least one fingerprint image parameter value indicative of a fingerprint image status based on at least one fingerprint image in the navigation sequence of fingerprint images; and evaluating the fingerprint image status. The method further comprises the steps of determining a fingerprint sensing circuitry setting based on the evaluation; and providing the fingerprint sensing circuitry setting to the fingerprint sensing circuitry only during a time period between acquisition of a final fingerprint image in one navigation sequence and acquisition of a first fingerprint image in another, directly succeeding, navigation sequence.

BRIEF DESCRIPTION OF THE DRAWINGS

These and other aspects of the present invention will now be described in more detail, with reference to the appended drawings showing an example embodiment of the invention, wherein:

FIG. 9 is a circuit diagram schematically illustrating the configuration of the fingerprint sensor in FIG. 8, and control of the fingerprint sensing circuitry using a fingerprint sensing circuitry setting.

DETAILED DESCRIPTION OF EXAMPLE EMBODIMENTS

Figure 1:
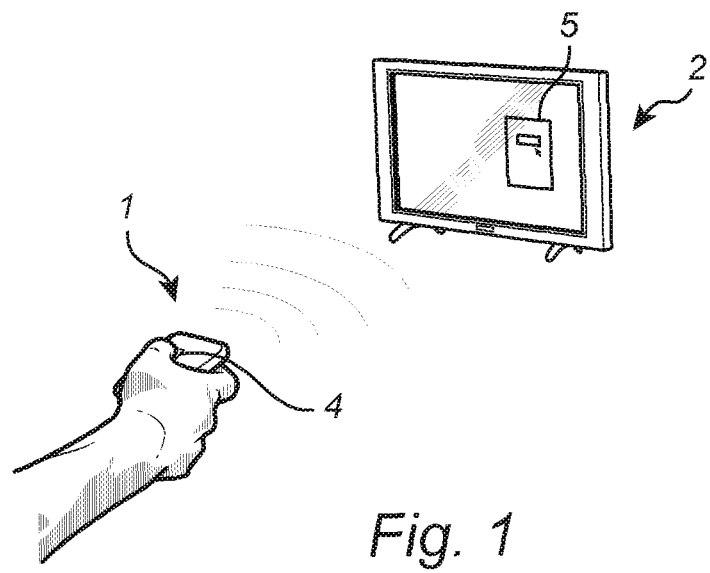
FIG. 1 schematically shows an exemplary application for the finger navigation system according to embodiments of the present invention, in the form of a remote control for a television set.

FIG. 1 schematically shows an example application for the finger navigation system according to embodiments of the present invention, in the form of a remote control device 1 for controlling operation of a television set 2. It should be noted that the remote control device 1 is an example application only, and that the finger navigation system according to embodiments of the present invention could equally well be included in other electronic devices, such as mobile phones or computers etc, as long as movement of the user's finger across the fingerprint sensor is used for controlling operation of the electronic device.

Referring to FIG. 1, the remote control device 1 comprises a finger navigation system 4, and a wireless transmitter, such as an infrared LED (not shown in FIG. 1). The television set 2 comprises a wireless receiver, such as a photodetector (not shown) for receiving signals transmitted by the remote control device 1. Based on the received signals, the television set 2 may be controlled to, for example, change channels or, as is schematically indicated in FIG. 1, select among options in a menu dialog 5.

Figure 2:
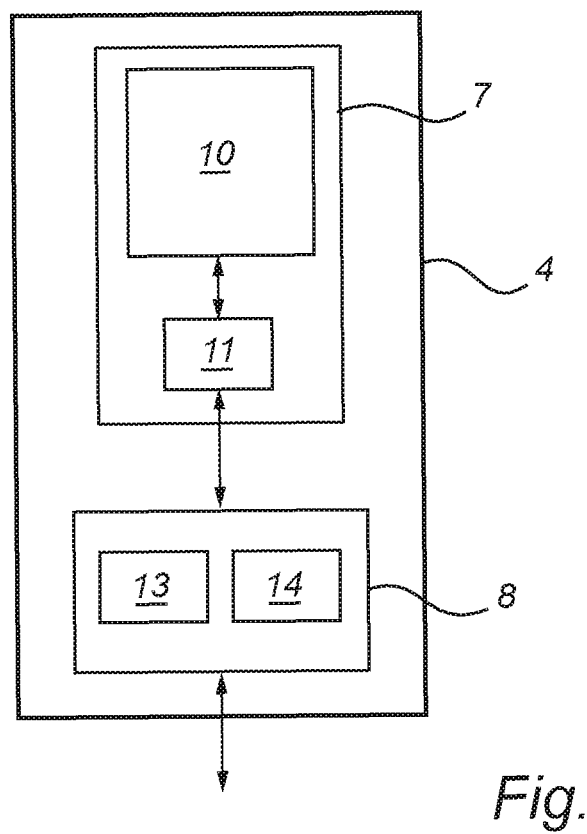
FIG. 2 is a schematic block diagram of the finger navigation system comprised in the remote control in FIG. 1.

Referring to FIG. 2, which is a schematic block diagram of the finger navigation system comprised in the remote control device 1 in FIG. 1, the finger navigation system 4 comprises a fingerprint sensor 7, and a control unit 8. The fingerprint sensor 7 comprises fingerprint sensing circuitry 10, here in the form of an array of sensing elements, and movement estimation circuitry 11. The control unit 8 includes process control circuitry 13 and a memory 14.

A method for fingerprint-based navigation according to an example embodiment of the present invention, using the finger navigation system in FIG. 2, will now be described with reference to the schematic flow-chart in FIG. 3, as well as to the illustrations provided in FIGS. 4 to 9.

Figure 3:
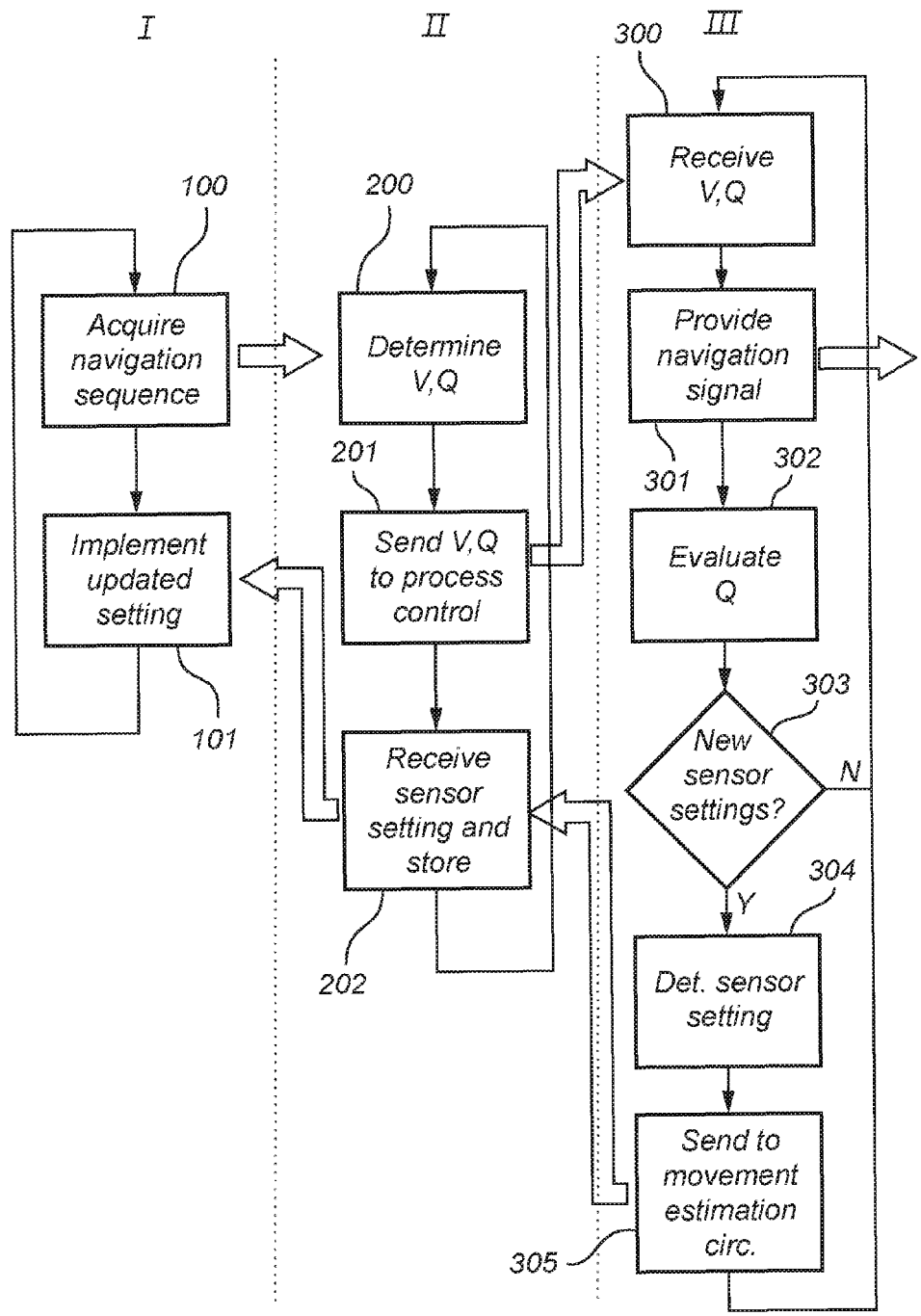
FIG. 3 is a flow-chart schematically illustrating a method for fingerprint-based navigation according to an example embodiment of the present invention.

In the example embodiment shown in FIG. 3, the method is carried out in parallel by the fingerprint sensing circuitry 10, the movement estimation circuitry 11, and the process control circuitry 13. In FIG. 3, this is schematically illustrated by three separate sub-processes labeled 'I', 'II', and 'III', respectively. Although the sub-processes are performed in parallel, there is some interaction between the sub-processes, and there are some requirements on the timing of certain steps as will be described further below.

To aid the understanding of the present invention, the steps of the different sub-processes will first be briefly introduced, and the method of FIG. 3 will then be described in more detail with additional reference to FIGS. 4 to 9.

Referring first to sub-process 'I', the fingerprint sensing circuitry 10 acquires a navigation sequence (such as the $n^{th}$ navigation sequence in a series of navigation sequences) in a first step 100. If a new fingerprint sensing circuitry setting is available for implementation, such a new setting is implemented in the subsequent step 101, before the first sub-process returns to step 100 to acquire the next navigation sequence. Thus, possible implementation of an updated fingerprint sensing circuitry setting will take place in the time period between acquisition of the final fingerprint image in the $n^{th}$ navigation sequence and acquisition of the first fingerprint image in the $(n+1)^{th}$ navigation sequence.

Turning to sub-process 'II', an estimated momentary finger movement v and at least one fingerprint image parameter value Q indicative of a fingerprint image status are determined in a first step 200. In the subsequent step 201, v and Q are sent, encoded in a signal, to the process control circuitry 13. In the next step 202, an updated fingerprint sensing circuitry setting is received from the process control circuitry 13 and stored—if an updated fingerprint sensing circuitry setting is sent from the process control circuitry 13. This sequence of steps (with the possible exception of step 202) is carried out for each navigation sequence acquired in sub-process 'I' as described above.

Finally, in sub-process 'III', the process control circuitry 13 receives v and Q from the movement estimation circuitry 11 in a first step 300. In the subsequent step 301, the process control circuitry provides a navigation signal that may be used for controlling a cursor etc as was briefly described above with reference to FIG. 1. In the next step 302, the fingerprint image status is evaluated. Based on the evaluation carried out in step 302, it is determined in step 303 if there is a need for a new fingerprint sensing circuitry setting to maintain (or improve) the navigation performance. If it is determined in step 303 that it is not necessary or desirable to currently adapt the fingerprint sensing, the sub-process returns to step 300. If it is instead determined in step 303 that it would be beneficial to adapt the fingerprint sensing, an updated fingerprint sensing circuitry setting is determined in step 304, and the updated setting is sent to the movement estimation circuitry 11 in the final step 305 of the sub-process. Thereafter, the sub-process returns to step 300.

Having now provided a brief introduction to the different sub-processes, the method will be further described below in an example sequence of events. It should be understood that various steps may advantageously be performed in parallel.

Figure 4:
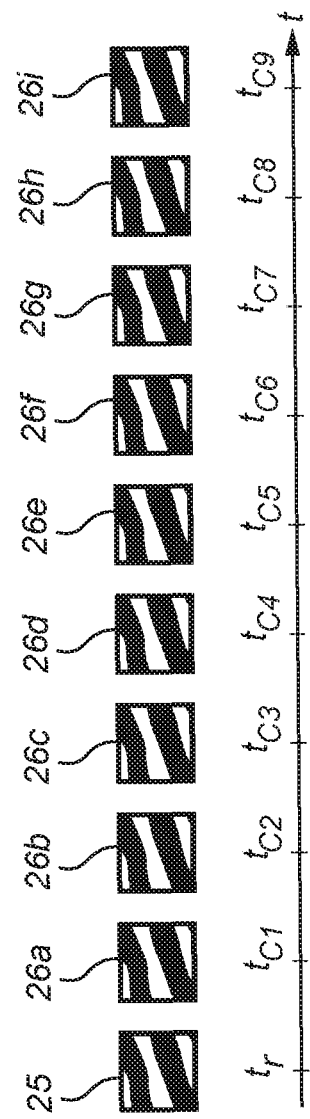
FIG. 4 schematically illustrates and exemplary navigation sequence of fingerprint images.

Referring also to FIG. 4, each navigation sequence acquired by the fingerprint sensing circuitry 10 in step 100 may include a reference fingerprint image 25 acquired at the reference image acquisition time $t_r$, and a time sequence of candidate fingerprint images 26a-i acquired at candidate fingerprint acquisition times $t_{c1}$-$t_{c9}$.

During acquisition of the candidate fingerprint images 26a-i in the navigation sequence, the movement estimation circuitry 11 may, in step 200, determine a match parameter value for each of a plurality of candidate finger movement directions based on a correlation between a reference fingerprint image portion (of the reference fingerprint image) corresponding to a reference area of the fingerprint sensor 7 and a candidate fingerprint image portion (of the candidate fingerprint image) corresponding to a candidate area of the fingerprint sensor 7. For each of the candidate finger movement directions, the candidate area is displaced in the candidate finger movement direction in relation to the reference area.

Match parameter values indicating the correlation between candidate fingerprint image portions and the reference fingerprint image portion may be determined separately for each candidate finger movement direction, and the finger movement (finger movement direction and/or finger speed) may be determined based on the match parameter values. The candidate finger movement direction providing the best match may be selected, and the time until the best match together with the acquisition frequency may be used to determine the finger speed. The selected candidate finger movement direction and the estimated finger speed may together constitute the estimated momentary finger movement v.

Figure 5:
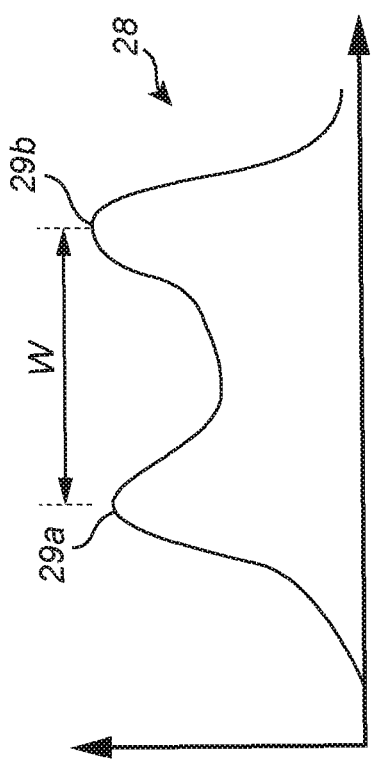
FIG. 5 is a schematic illustration of an example of a fingerprint image parameter value obtained from the navigation sequence in FIG. 4.

In step 200, the above-mentioned at least one fingerprint image parameter value Q is also determined. Referring additionally to FIG. 5, the fingerprint image parameter value may, for example, be an indication of the separation between pixel values representing fingerprint valleys and ridges. FIG. 5 schematically shows an example histogram 28 that may be obtained through per se known statistical analysis of the fingerprint images in the acquired navigation sequence. In the histogram 28, there is a first peak 29a representing the number of sensing elements sensing fingerprint valleys and a second peak 29b representing the number of sensing elements sensing fingerprint ridges. The distance (for example in the terms of "gray levels") w between the first peak 29a and the second peak 29b is one example of a fingerprint image parameter value that may be useful to evaluate in order to maintain or improve the fingerprint image quality during finger navigation.

Referring again to the flow-chart in FIG. 3, the estimated momentary finger movement v and the fingerprint image parameter value Q (in this case the above-mentioned histogram width w) are sent to the process control circuitry 13 in step 201.

After having received v and Q, the process control circuitry 13 evaluates, as described above, the fingerprint image status in step 302 and sends, where applicable, an updated fingerprint sensing circuitry setting to the movement estimation circuitry 11 in step 305. The evaluation and sending and various other steps carried out by the process control circuitry 13 may typically take place while the fingerprint sensing circuitry 10 is acquiring fingerprint images in a navigation sequence.

However, the implementation of the updated setting, in step 101, may only take place in the time periods between the acquisition of consecutive navigation sequences.

This timing will now be explained in more detail with reference to FIG. 6, which is a timing diagram schematically illustrating a navigation operation including acquisition of five navigation sequences 31a-e of fingerprint images.

Figure 6:
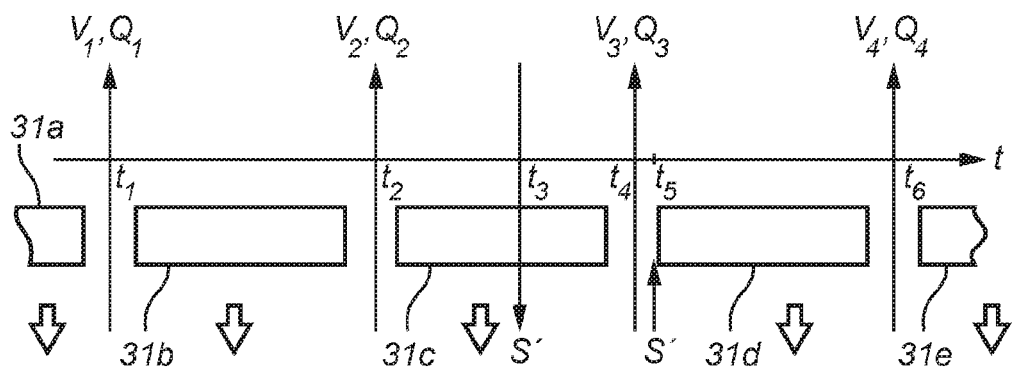
FIG. 6 schematically illustrates timing in the method in FIG. 3.

Referring to FIG. 6, image data is shown to be provided from the fingerprint sensing circuitry 10 to the movement estimation circuitry 11 by block arrows, while parameter values and settings are shown to be provided between the various circuitry by single line arrows.

In FIG. 6, a first estimated momentary finger movement $v_1$ and a first fingerprint image parameter value $Q_1$ are provided (step 201) from the movement estimation circuitry 11 to the process control circuitry 13 at a time $t_1$. As is shown in FIG. 6, the time $t_1$ is between the end of the first navigation sequence 31a and the beginning of the second navigation sequence 31b.

Figure 7:
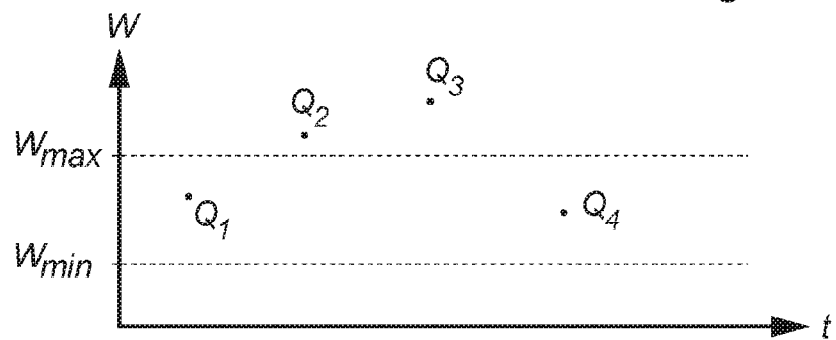
FIG. 7 illustrates an example evaluation of the fingerprint image status based on fingerprint image parameter values for each navigation sequence in a series of navigation sequences.

In FIG. 7, the first fingerprint image parameter value $Q_1$ is illustrated as a first histogram width being between a predefined minimum histogram width $w_{min}$ and a predefined maximum histogram width $w_{max}$.

Since $Q_1$ is within a predefined allowable range, the evaluation carried out by the process control circuitry (step 302) results in the conclusion that there is currently no need to determine an updated sensor setting. Therefore, no updated sensor setting is sent from the process control circuitry 13 to the movement estimation circuitry 11.

Following the end of the second navigation sequence 31b, $v_2$ and $Q_2$ are sent from the movement estimation circuitry 11 to the process control circuitry 13 at a time $t_2$. Referring again to FIG. 7, $Q_2$ is outside the allowable range. As a result of the evaluation in step 302, the process control circuitry therefore determines an updated sensor setting (step 304), and sends the updated sensor setting S' to the movement estimation circuitry (step 305) at a time $t_3$, which is during acquisition of the third navigation sequence 31c of fingerprint images.

Following the end of the third navigation sequence 31c, $v_3$ and $Q_3$ are sent from the movement estimation circuitry 11 to the process control circuitry 13 at a time $t_4$. Referring again to FIG. 7, like $Q_2$, $Q_3$ is outside the allowable range. Since the difference between $Q_2$ and $Q_3$ is relatively small and an updated fingerprint sensing circuitry setting has already been sent to the movement estimation circuitry, the result of the evaluation in step 302 is now that no new sensor setting needs to be determined at this time.

Also following the end of the third navigation sequence 31c and before the beginning of the fourth navigation sequence 31d, at a time $t_5$, the updated fingerprint sensing circuitry setting S' is implemented in the fingerprint sensing circuitry 10.

Following the end of the fourth navigation sequence 31d, $v_4$ and $Q_4$ are sent from the movement estimation circuitry 11 to the process control circuitry 13 at a time $t_6$. Referring again to FIG. 7, $Q_4$ is again inside the allowable range, due to the updated fingerprint sensor setting S'.

Finally, an example embodiment of the fingerprint sensor 7 and implementation of an updated sensor setting will now be described with reference to FIG. 8 and FIG. 9.

Figure 8:
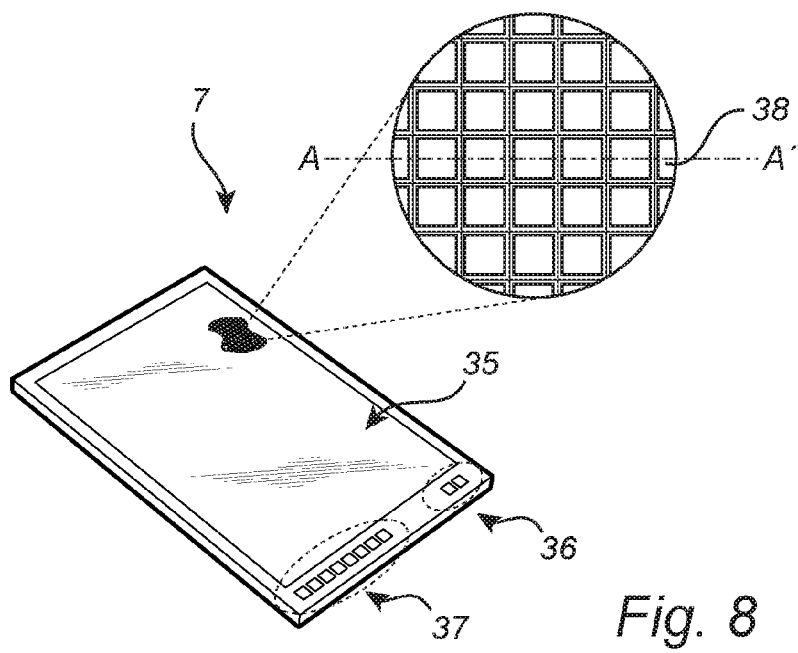
FIG. 8 schematically shows an example of a fingerprint sensor component that may be comprised in the finger navigation system in FIG. 2.

As can be seen in FIG. 8, the fingerprint sensor 37 comprises a sensor array 35, a power supply interface 36 and a communication interface 37. The sensor array 35 comprises a number of sensing elements 38 (only one of the sensing elements has been indicated with a reference numeral to avoid cluttering the drawing), each being controllable to sense a distance between a sensing structure (top plate) comprised in the sensing element 38 and the surface of a finger contacting the top surface of the sensor array 35.

The communication interface 37 comprises a number of bond pads for allowing control of the fingerprint sensor 7 and for communication between the estimation control circuitry 11 comprised in the fingerprint sensor 7 and the process control circuitry 13 arranged outside the fingerprint sensor 7.

FIG. 9 is, in part, a schematic cross-section view of one of the sensing elements 38 in the fingerprint sensor 7 in FIG. 8, and in part a functional block diagram illustrating the operation of the fingerprint sensor 7 including implementation of an updated fingerprint sensing circuitry setting.

Referring to FIG. 9, the sensing element 38 comprises a protective dielectric top layer 40 to be touched by a finger 41 (FIG. 9 schematically shows a cross-section of a single ridge of a finger pattern), an electrically conductive sensing structure (plate) 42, and a charge amplifier 43. The charge amplifier 43 comprises a negative input 45, a positive input 46, an output 47, a feedback capacitor 48, and an amplifier 49.

The negative input 45 is connected to the sensing structure (plate) 42, the positive input 46 is connected to ground and the output 47 is connected to the read-out circuitry 36.

The feedback capacitor 48 is connected between the negative input 45 and the output 47 and defines the amplification of the charge amplifier 43, and the sensing element 38 further comprises a reset switch 44 in parallel with the feedback capacitor 48.

Outside the sensing element 38, the block diagram in FIG. 9 schematically readout circuitry 36 comprising a sample-and-hold circuit (S/H-circuit) 51 and an analog-to-digital converter (ADC) 52 included in the fingerprint sensing circuitry 10 together with the sensing element, the movement estimation circuitry 11, and an excitation signal amplifier 39.

When the fingerprint sensing circuitry 10 (sensing elements 38, excitation amplifier 39 and readout circuitry 36) is in operation, the timings of the excitation signal amplifier, the reset switch 44, and the S/H circuit 51 are controlled in relation to each other to sample a voltage being indicative of the change in the charge carried by the sensing structure 42 resulting from the change in potential difference between the finger 41 and the sensing structure. This analog voltage is converted to a digital value by the ADC 52, and digital values for each sensing element are provided from the ADC 52 (or several ADCs operating in parallel) to the movement estimation circuitry 11 as is indicated by the block arrow in FIG. 9. As is indicated in FIG. 9 with line arrows, and as was described above, the movement estimation circuitry communicates with fingerprint sensing circuitry (the excitation amplifier 39, the S/H-circuit 51 and the ADC 52), and with the process control circuitry arranged outside the fingerprint sensor component 7.

As is schematically indicated in FIG. 9, the updated fingerprint setting S' stored by the movement estimation circuitry 11 may be implemented as parameters of the S/H-circuit 51 and/or the ADC 52. For instance, the sampling time(s) and/or number of samples performed by the S/H-circuit may be changed, and/or analog-to-digital conversion parameters (such as shift and/or gain) of the ADC 52 may be changed.

The person skilled in the art realizes that the present invention by no means is limited to the preferred embodiments described above. On the contrary, many modifications and variations are possible within the scope of the appended claims. For example, the process control circuitry 13 may be included in the fingerprint sensor component 7 together with the movement estimation circuitry 11.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for fingerprint-based navigation using a finger navigation system comprising fingerprint sensing circuitry and navigation control circuitry, said method comprising the steps of:
    acquiring, by said fingerprint sensing circuitry, a series of navigation sequences of fingerprint images;
    determining, by said navigation control circuitry, for each navigation sequence in said series of navigation sequences, an estimated momentary finger movement based on said navigation sequence of fingerprint images;
    determining, by said navigation control circuitry, for each navigation sequence in said series of navigation sequences, at least one fingerprint image parameter value indicative of a fingerprint image status based on at least one fingerprint image in said navigation sequence of fingerprint images;
    evaluating, by said navigation control circuitry, for each navigation sequence in said series of navigation sequences, said fingerprint image status;
    determining, by said navigation control circuitry, a fingerprint sensing circuitry setting based on said evaluation; and
    providing, by said navigation control circuitry, said fingerprint sensing circuitry setting to said fingerprint sensing circuitry only during a time period between acquisition of a final fingerprint image in one navigation sequence and acquisition of a first fingerprint image in another, directly succeeding, navigation sequence.

2. The method according to claim 1, wherein:
    said navigation control circuitry comprises movement estimation circuitry and process control circuitry;
    said movement estimation circuitry performs the step of determining said estimated momentary finger movement;
    said movement estimation circuitry performs the step of determining said at least one fingerprint image parameter value indicative of said fingerprint image status;
    said process control circuitry performs the step of evaluating said fingerprint image status;
    said process control circuitry performs the step of determining said fingerprint sensor circuitry setting;
    said movement estimation circuitry performs the step of providing said fingerprint sensing circuitry setting to said fingerprint sensing circuitry; and
    the method further comprises the steps of:
    providing, by said movement estimation circuitry, for each navigation sequence in said series of navigation sequences, said estimated momentary finger movement and said at least one fingerprint image parameter value to said process control circuitry; and
    providing, by said process control circuitry, said fingerprint sensing circuitry setting to said movement estimation circuitry.

3. The method according to claim 1 or 2, further comprising the step of:
    storing, by said navigation control circuitry, said fingerprint sensing circuitry setting before providing said fingerprint sensing circuitry setting to the fingerprint sensing circuitry.

4. The method according to any one of the preceding claims, wherein the step of evaluating said fingerprint image status comprises the step of:
    comparing an image quality indicator derived from said at least one fingerprint image parameter value with a predefined image quality indicator threshold value.

5. The method according to any one of the preceding claims, wherein the step of evaluating said fingerprint image status comprises the step of:
    evaluating said estimated momentary finger movement, wherein said fingerprint sensing circuitry setting is further based on the evaluation of said estimated momentary finger movement.

6. The method according to any one of claims 2 to 5, wherein said finger navigation system comprises:
    a fingerprint sensor component including said fingerprint sensing circuitry and said movement estimation circuitry; and
    a control unit including said process control circuitry.

7. The method according to any one of the preceding claims, wherein:

each navigation sequence of fingerprint images comprises a reference fingerprint image acquired at a reference fingerprint image acquisition time; and at least one candidate fingerprint image acquired at each candidate fingerprint image acquisition time in a time sequence of candidate fingerprint image acquisition times; and the step of determining said estimated momentary finger movement comprises the steps of:

determining, for each of said candidate fingerprint image acquisition times, a match parameter value for each of a plurality of candidate finger movement directions, said match parameter value being indicative of a correlation between a reference fingerprint image portion corresponding to a reference area of said fingerprint sensor and a candidate fingerprint image portion corresponding to a candidate area of said fingerprint sensor, said candidate area being displaced in said candidate finger movement direction in relation to said reference area; and estimating said finger movement based on an evaluation of said determined match parameter values.

8. The method according to claim 7, wherein:

each candidate area is displaced by a respective known displacement distance in relation to said reference area; and said candidate fingerprint images are acquired with an acquisition frequency resulting in acquisition of at least three candidate fingerprint images during the time needed for said finger to move said displacement distance.

9. The method according to claim 8, wherein said acquisition frequency is at least 3000 candidate fingerprint images per second.

10. The method according to any one of claims 7 to 9, wherein:

each candidate area is displaced by a respective known displacement distance in relation to said reference area; and the step of determining said momentary finger movement estimation comprises estimating a speed of said finger based on said evaluation of said determined match parameter values, and said known displacement distances.

11. The method according to any one of claims 7 to 10, wherein the match parameter value for each of said plurality of candidate finger movement directions is determined using a block matching algorithm.

12. A finger navigation system for estimating a finger movement of a finger, said finger navigation system comprising:

fingerprint sensing circuitry for acquiring a series of navigation sequences of fingerprint images; and navigation control circuitry for:

determining, for each navigation sequence in said series of navigation sequences, an estimated momentary finger movement based on said navigation sequence of fingerprint images;

determining, for each navigation sequence in said series of navigation sequences, at least one fingerprint image parameter value indicative of a fingerprint image status based on at least one fingerprint image in said navigation sequence of fingerprint images;

evaluating, for each navigation sequence in said series of navigation sequences, said fingerprint image status;

determining, a fingerprint sensing circuitry setting based on said evaluation; and providing said fingerprint sensing circuitry setting to said fingerprint sensing circuitry only during a time period between acquisition of a final fingerprint image in one navigation sequence and acquisition of a first fingerprint image in another, directly succeeding, navigation sequence.

13. The finger navigation system according to claim 12, wherein said navigation control circuitry comprises movement estimation circuitry and process control circuitry, wherein:

said movement estimation circuitry is configured to:

determine said estimated momentary finger movement;

determine said least one fingerprint image parameter value indicative of a fingerprint image status based on at least one fingerprint image in said navigation sequence of fingerprint images;

provide, for each navigation sequence in said series of navigation sequences, said estimated momentary finger movement and said at least one fingerprint image parameter value to said process control circuitry;

receive said fingerprint sensing circuitry setting from said process control circuitry; and provide said fingerprint sensing circuitry setting to said movement estimation circuitry.

14. The finger navigation circuitry according to claim 13, comprising:

a fingerprint sensor component including said fingerprint sensing circuitry and said movement estimation circuitry; and a control unit including said process control circuitry, said control unit being operatively connected to said fingerprint sensor component.

15. The finger navigation system according to any one of claims 12 to 14, wherein said fingerprint sensing circuitry is configured to acquire at least 3000 candidate fingerprint images per second.

16. The finger navigation system according to any one of claims 12 to 15, wherein said fingerprint sensing circuitry comprises a plurality of sensing element, each comprising:

a protective dielectric top layer to be touched by said finger;

an electrically conductive sensing structure arranged underneath said top layer; and charge measuring circuitry connected to said sensing structure for providing a sensing signal indicative of a change of a charge carried by said sensing structure resulting from a change in a potential difference between said finger and said sensing structure.

\* \* \* \* \*